United States Patent Office 3,397,158
Patented Aug. 13, 1968

3,397,158
CELLULAR POLYURETHANES
J W. Britain, New Martinsville, and Paul G. Gemeinhardt, Sistersville, W. Va., assignors to Mobay Chemical Company, Pittsburgh, Pa., a corporation of Delaware
No Drawing. Filed Nov. 3, 1958, Ser. No. 771,242
20 Claims. (Cl. 260—2.5)

This invention relates generally to the preparation of polyurethanes and, more particularly, to an improved method for making a cellular or non-porous polyurethane plastic.

Polyurethanes may be prepared by reacting an hydroxyl terminated polyester or a polyalkylene ether glycol or the like with an organic polyisocyanate. A substantially non-porous product can be prepared by effecting the reaction under substantially anhydrous conditions. If a cellular product is desired, water may be included in the mixture. The water reacts with —NCO groups of an isocyanate to form carbon dioxide. The carbon dioxide becomes entrapped in the viscous reaction mixture and remains there during solidification to form a cellular structure. Although polyalkylene ether glycols have been suggested for the preparation of polyurethanes, it has been the practice commercially, until recently, to make most polyurethanes from polyesters because all of the components used in preparing the product from a polyester can be mixed together at one time. If a polyalkylene ether glycol, and particularly one having secondary hydroxyl groups, is merely substituted into the known polyester processes, a product which is entirely commercially suitable is not always obtained. For example, a two-step process has been required for consistently making cellular polyurethanes commercially from polyalkylene ether glycols and other available components. In such a process, the polyalkylene ether glycol is reacted first with an organic polyisocyanate under substantially anhydrous conditions to form an adduct or prepolymer having terminal —NCO groups. This prepolymer and unreacted organic polyisocyanate are reacted with water to form a cellular product. In an alternate method, an inert gas is added to the reaction mixture as a blowing agent either to supplement the gas formed by reaction of water and —NCO groups or to provide all of the blowing. In the latter case, the reaction mixture is substantially anhydrous.

Although cellular polyurethanes prepared by the two-step technique with polyalkylene ether glycols and similar condensation products of an alkylene oxide have many advantages over cellular polyurethanes prepared from polyesters, no entirely suitable commercial process has been available because the use of the two steps increases the cost of the product and increases the amount of material which must be handled. Moreover, it has been necessary to control the preparation of the prepolymer very closely in order that a product which is substantially uniform in composition from one batch to another is available for the second reaction. Furthermore, the polyalkylene ether glycol prepolymers are not completely stable, so storage of the prepolymers frequently introduces a problem in the second step because of change in the chemical composition of the prepolymer during the storage period.

It is, therefore, an object of this invention to provide an improved method for preparing either a cellular or non-cellular polyurethane from a polyalkylene ether glycol and an organic polyisocyanate. Another object of the invention is to provide a novel catalyst for polyurethane processes. A more specific object of the invention is to provide a method for making polyurethane plastics and particularly cellular polyurethane plastics by a process which involves reacting a polyalkylene ether glycol or other polyol prepared by condensation of an alkylene oxide and an organic polyisocyanate together in which all components can be mixed together simultaneously. Still another object of the invention is to provide a method for making polyurethanes in which the reactants may be mixed together simultaneously or a prepolymer can be prepared in a separate step.

The foregoing objects and others are accomplished in accordance with this invention, generally speaking, by providing a method for making a polyurethane plastic wherein a polyol prepared by condensation of an alkylene oxide and having a molecular weight of at least about 500 and an organic polyisocyanate are reacted while mixed with a catalytic amount of either stannous chloride, stannous octoate, stannous oleate, a trialkyl tin oxide, a dialkyl tin chloride, a dialkyl tin oxide or a dialkyl tin salt of a carboxylic acid having from 1 to 18 carbon atoms. Preferably, in the preparation of a cellular polyurethane, water is mixed with the condensation product of an alkylene oxide and organic polyisocyanate to produce a carbon dioxide which acts as the only blowing agent but an inert gas blowing agent may be used along with or instead of water if desired. The invention is most advantageous in a process where carbon dioxide is produced by reaction of water with —NCO groups because it provides a method wherein water, organic polyisocyanates and the condensation product of an alkylene oxide may all be mixed together simultaneously. Best results are obtained when a catalyst containing one of the said tin compounds is used in combination with a stabilizer containing a siloxane oxyalkylene block copolymer having the formula

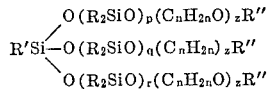

wherein R, R' and R" are alkyl radicals having 1 to 4 carbon atoms; p, q and r each have a value of from 4 to 8 and $(C_nH_{2n}O)_z$ is a mixed polyoxyethylene oxypropylene block containing from 15 to 19 oxyethylene units and from 11 to 15 oxypropylene units with z equal to from about 26 to about 34 or similar stabilizer so a process which combines this catalyst and stabilizer is contemplated by the invention as a preferred embodiment. Compounds represented by the formula and a method for making them are disclosed in U.S. Patent 2,834,748.

As suggested hereinbefore, it has been found that the reaction components of a cellular polyurethane plastic including a polyalkylene ether glycol as the major component supplying hydroxyl groups may all be mixed together substantially simultaneously providing one of the catalysts specified hereinbefore is used. Preferably, a silicone having the above formula is included in the formulation as a stabilizer in a "one-shot" method. The invention thus contemplates a so-called "one-shot" method for making cellular polyurethane plastics from a polyalkylene ether glycol and similar compounds prepared by condensation of an alkylene oxide which process is made possible by the use of one of the novel catalysts and, preferably, the concurrent use of a compound of the above formula as a stabilizer.

It has also been found that an improved process results when one of the above-identified catalysts is used in combination with another catalytic compound and that in some instance an equivalent or even further improvement over prior art processes is obtained by using one of the above-identified catalysts in combination with a catalyst to be identified hereinafter instead of using the above-identified catalyst alone. The particular catalyst found suitable for use in conjunction with stannous chloride, stannous oleate, stannous octoate, a dialkyl tin oxide, a trialkyl tin oxide or a dialkyl tin salt of a carboxylic acid having from 1 to 18 carbon atoms may be either triethylene diamine, N,N,N,N-tetramethyl butylene diamine or a 1-alkyl-4-(dialkyl amino alkylene)piperazine in which the alkyl radicals have from 1 to 4 carbon atoms and the alkylene radical has from 2 to 4 carbon atoms. As when the catalyst containing one of the tin compounds alone is used, it is preferred to include a stabilizer of the type represented by the siloxane oxyalkylene block copolymer in the reaction mixture when the mixed catalyst is used.

When using one of the tin-containing compounds disclosed hereinbefore as a catalyst alone, from about 0.1 to about 3 parts catalyst per 100 parts of polyol condensation product of an alkylene oxide are used. When using one of the tin-containing compounds in combination with triethylene diamine, N,N,N,N-tetramethyl butylene diamine or a piperazine compound having the formula given hereinafter, preferably from about 0.1 to about 0.5 part of the tin-containing catalyst and from about 0.2 to about 3.0 parts of the triethylene diamine, N,N,N,N-tetramethyl butylene diamine or piperazine compound will be used. The invention also contemplates processes in which the various tin-containing catalysts are used while mixed together as well as catalysts containing one or more of the tin-containing compounds with one or more of the other catalysts described above.

Although the process provided by this invention using one of the catalysts containing one of the specified tin compounds is most advantageous because it permits the mixing of all of the ingredients together simultaneously, it is possible to prepare a polyurethane plastic using one of the catalysts disclosed herein in accordance with a two-step process. In the two-step process, the polyol prepared by condensing compounds including an alkylene oxide is reacted with an excess of an organic polyisocyanate to form an adduct or prepolymer having terminal —NCO groups. This prepolymer is then reacted with water in a second step to form the cellular polyurethane. When using the catalyst in this type of process, it is mixed with the prepolymer and the water in the second step of the process. The amount of isocyanate, catalyst and water used in the two-step process is essentially the same as that used when a "one-shot" method is employed.

As indicated hereinbefore, the process provided by this invention is particularly well suited for making cellular polyurethanes but nonporous polyurethane plastics may also be made. The catalysts provided by the invention are advantageous in preparing substantially nonporous products either by casting processes or processes in which a millable gum is formed. In processes of this type, the condensation product of an alkylene oxide is reacted with an organic polyisocyanate and a chain extender. Any known chain extenders may be used, such as, for example, ethylene glycol, water, diethylene glycol, trimethylol propane, diethanolamine, ethylene diamine, 1,3-butylene glycol, 1,4-butylene glycol, and the like. The siloxane oxyalkylene block copolymer is not required in preparing a nonporous product.

Any polyalkylene ether glycol or similar polyol condensation product of an alkylene oxide having a molecular weight of at least about 500 and prepared by condensation of an alkylene oxide having from 2 to 5 carbon atoms, such as, for example, a polypropylene ether glycol, polyethylene ether glycol, polybutylene ether glycol, a glycol prepared by polymerization of tetrahydrofuran or mixtures thereof, may be used. Likewise, the condensation product of one of the said alkylene oxides with an alcohol having more than two hydroxyl groups may be used providing the condensation product has a molecular weight of at least about 500. The polyalkylene ether glycols and other condensation products of an alkylene oxide and alcohol may be prepared by any known condensation process. The processes disclosed by Wurtz in 1859 and in "Encyclopedia of Chemical Technology," volume 7, pages 257 to 262, published by Interscience Publishers, Incorporated, 1951, may be used in making the condensation products of alkylene oxide contemplated herein. In such a process, the alkylene oxide is continuously fed into a reaction vessel containing water or a polyhydric alcohol and a caustic material such as sodium hydroxide or potassium hydroxide. The reaction is usually carried out at a pressure above atmospheric and a temperature of from about 50° C. to about 200° C. When the reaction product has reached the desired molecular weight the reaction is stopped and the alkali neutralized. Examples of suitable alkylene oxides include ethylene oxide, propylene oxide, butylene oxide and the like. These oxides may be condensed with water or any suitable alcohol, such as, for example, ethylene glycol, glycerine, trimethylolpropane, hexanetriol-1,2,6-pentaerythritol or the like. If the condensation product is prepared from a triol, it will have three hydroxyl groups while it will have four hydroxyl groups if pentaerythritol or a similar polyhydric compound is used with the alkylene oxide in the condensation process. The condensation product of an alkylene oxide contemplated as the polyhydroxy compound to be reacted with a polyisocyanate may contain aryl radicals such as would be obtained by reaction of a polyalkylene ether glycol with an aromatic compound having carboxyl groups or an anhydride, such as, for example, phthalic acid, terephthalic acid, phthalic anhydride, polycarbonates including 2,2' - bis(4 - hydroxy phenyl)propane, and the like. Compounds of this type are included herein and in the claims as condensation products of an alkylene oxide. The polyalkylene ether glycols and other polyhydric condensation products contemplated by the invention are referred to herein frequently for convenience as "polyols." Preferably, the hydroxyl number of these polyols will not exceed about 225 and the acid number will not be more than about 5.

Any suitable organic polyisocyanate including those disclosed in U.S. Patent 2,764,565 may be used to react with the polyols. 2,4-tolylene or 2,6-tolylene diisocyanate, p,p'-diphenyl methane diisocyanate, 1,5-naphthalene diisocyanate, hexamethylene diisocyanate and the like are examples of suitable diisocyanates. Preferably, arylene diisocyanates are used. Any suitable triisocyanate may also be used, such as, for example, 4,4',4''-triphenylmethane triisocyanate. Suitable emulsifiers including those disclosed in U.S. Patent 2,764,565 may be included in the mixture if desired.

As indicated hereinbefore, the catalyst provided by this invention may be any suitable dialkyl tin salt of a carboxylic acid having from 1 to 18 carbon atoms but best results are obtained if the acid contains from 1 to 8 carbon atoms. The two alkyl groups may be alike or different. The alkyl groups may contain from 1 to 18 carbon atoms. Examples of such compounds include dibutyl tin diacetate, dibutyl tin diformate, dimethyl tin adipate, dibutyl tin maleate, dipropyl tin diacetate, diethyl tin diformate, dipropyl tin dioleate, dipropyl tin dipropionate, diamyl tin dipropionate, dioctyl tin diacetate and the like. Likewise, any suitable trialkyl tin oxide, dialkyl tin oxide or dialkyl tin chloride may be used. The alkyl groups on these compounds may contain from 1 to 18 carbon atoms. Examples of such compounds include tributyl tin oxide, trioctyl tin oxide, dibutyl tin oxide, dipropyl tin oxide, dibutyl tin chloride, dipropyl tin chloride, dioctyl tin chloride and the like. The trialkyl tin oxides are more accurately called bis(trialkyl tin)oxides. The invention also contemplates in addition to stannous octoate and stannous oleate catalysts containing other stannous salts, such as stannous stearate, stannous acetate and stannous salts of similar acids having from 1 to 18 carbon atoms. The tin compound used as a catalyst in accordance with this invention must be soluble in the quantity used in at least one of the reactants used to make the polyurethane plastic. Preferably, the tin compound should be soluble in the condensation product of the alkylene oxide.

Of the tin-containing compounds disclosed herein as suitable catalysts best results have been obtained so far with dibutyl tin diacetate and dibutyl tin di(2-ethylhexoate) so these two catalysts are preferred. Stannous chloride modifies the reaction to advantage but is somewhat less suitable than the preferred compounds because the cellular polyurethane frequently has a yellow color when a pure white product is desired. Stannic chloride cannot be used.

The piperazines contemplated for mixing with the tin compounds may be represented by the formula

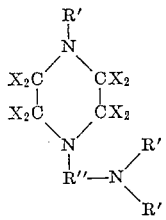

wherein R' is an alkyl radical having from 1 to 4 carbon atoms, R'' is an alkylene radical having from 2 to 4 carbon atoms and X is either hydrogen or an alkyl radical having from 1 to 4 carbon atoms. Examples of such compounds are 1-methyl-4-dimethyl amino ethyl piperazine, 1-ethyl-4-diethyl amino ethyl piperazine, 1-butyl-4-dibutyl amino ethyl piperazine and the like.

Cellular polyurethanes having tensile strength and having an improved resiliency over that of a polyester based cellular polyurethane may be prepared in accordance with this invention. The rigidity of the cellular polyurethane increases with an increase in the amount of triol or other polyfunctional compound in the mixture.

In order better to describe and further clarify the invention, the following are specific embodiments thereof.

EXAMPLE 1

About 100 parts by weight polypropylene ether glycol having an average molecular weight of about 2,000 and an hydroxyl number of about 56, about 38 parts of a mixture of 80 percent 2,4-tolylene diisocyanate and 20 percent 2,6-tolylene diisocyanate, about 5.5 parts of an activator containing about 1 part dibutyl-tin-di(2-ethylhexoate), about 3.0 parts water and about 1.5 parts of a compound having the formula

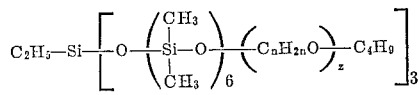

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Patent 2,764,565. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 2

About 100 parts by weight of a triol prepared by condensation of propylene oxide and glycerine and having a molecular weight of about 3,000, about 5.5 parts of an activator mixture containing about 1 part dibutyl-tin-di(2-ethylhexoate), about 3 parts water and about 1.5 parts of a compound having the formula

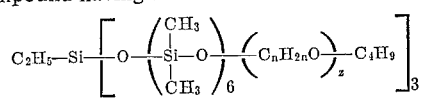

wherein ($C_nH_{2n}O$) represents about 17 oxyethylene units and about 13 oxypropylene units and the value of $z$ is thus about 30, and about 38 parts of a mixture containing about 80 percent 2,4-tolylene diisocyanate and about 20 percent 2,6-tolylene diisocyanate are all simultaneously mixed together substantially instantaneously. The resulting mixture reacts to form a cellular polyurethane having a density of about 2 pounds per cubic foot.

EXAMPLE 3

About 100 parts by weight polypropylene ether glycol having an average molecular weight of about 2,000 and an hydroxyl number of about 56, about 35 parts of a mixture of 80 percent 2,4-tolylene diisocyanate and 20 percent 2,6-tolylene diisocyanate, about 5 parts of an activator containing about 1 part dibutyl tin diacetate, about 2.5 parts water and about 1.5 parts of a compound having the formula

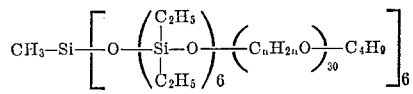

wherein ($C_nH_{2n}O$) represents about 17 oxyethylene units and about 13 oxypropylene units, are mixed together substantially simultaneously with an apparatus of the type disclosed in U.S. Patent 2,764,565. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2.5 pounds per cubic foot.

EXAMPLE 4

About 100 parts by weight polypropylene ether glycol having an average molecular weight of about 2,000 and an hydroxyl number of about 56, about 35 parts of a mixture of 80 percent 2,4-tolylene diisocyanate and 20 percent 2,6-tolylene diisocyanate, about 5 parts of an activator containing about 0.5 part stannous chloride, about 2.5 parts water and about 1.5 parts of a compound having the formula

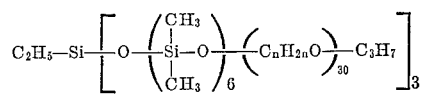

wherein ($C_nH_{2n}O$) represents about 15 oxyethylene units and about 15 oxypropylene units, are mixed together substantially simultaneously with an apparatus of the type disclosed in U.S. Patent 2,764,565. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2.5 pounds per cubic foot.

EXAMPLE 5

About 100 parts by weight polypropylene ether glycol having an average molecular weight of about 2,000 and an hydroxyl number of about 56, about 35 parts of a mixture of 80 percent 2,4-tolylene diisocyanate and 20 percent 2,6-tolylene diisocyanate, about 4.8 parts of an activator containing about 0.2 parts triethylene diamine and about 0.1 part dibutyl-tin-di(2 ethylhexoate), about 2.5 parts water and about 1.5 parts of a compound having the formula

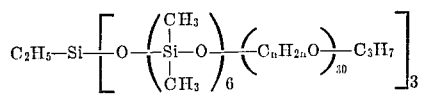

wherein ($C_nH_{2n}O$) represents about 15 oxyethylene units and about 15 oxypropylene units, are mixed together substantially simultaneously with an apparatus of the type disclosed in U.S. Patent 2,764,565. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2.5 pounds per cubic foot.

EXAMPLE 6

About 100 parts by weight polypropylene ether glycol having an average molecular weight of about 2,000 and an hydroxyl number of about 56, about 38 parts of a mixture of 80 percent 2,4-tolylene diisocyanate and 20 percent 2,6-tolylene diisocyanate, about 5.5 parts of an activator containing about 1 part dibutyl-tin-diacetate, about 3.0 parts water and about 1.5 parts of a compound having the formula

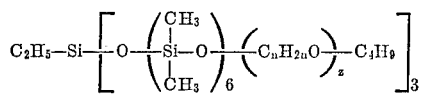

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Patent 2,764,565. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 7

About 100 parts by weight polypropylene ether glycol having an average molecular weight of about 2,000 and an hydroxyl number of about 56, about 38 parts of a mixture of 80 percent 2,4-tolylene diisocyanate and 20 percent 2,6-tolylene diisocyanate, about 5 parts of an activator containing about 0.1 part dibutyl-tin-di(2 ethylhexoate), about 0.4 part 1-methyl-4-dimethylamino ethyl piperazine, about 3.0 parts water and about 1.5 parts of a compound having the formula

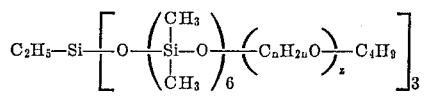

wherein ($C_nH_{2n}O$) represents about 17 oxyethylene units and about 12 oxypropylene units and the value of $z$ is thus about 30, are mixed together substantially simultaneously wwith an apparatus of the type disclosed in U.S. Patent 2,764,565. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 8

About 100 parts by weight polypropylene ether glycol having an average molecular weight of about 2,000 and an hydroxyl number of about 56, about 38 parts of a mixture of 80 percent 2,4-tolylene diisocyanate and 20 percent 2,6-tolylene diisocyanate, about 5 parts of an activator containing about 0.1 part dibutyl-tin-di(2 ethylhexoate), about 0.2 part tetramethyl butylene diamine, about 3.0 parts water and about 1.5 parts of a compound having the formula

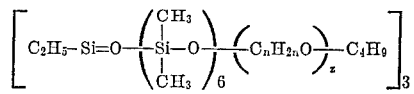

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Patent 2,764,565. The diisocyanate and activator mixture are injected into a stream of the poly alkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 9

About 100 parts by weight of the condensation product of hexanetriol-1,2,6 and propylene oxide having a molecular weight of about 700 are mixed with about 36 parts of a mixture of about 80 percent 2,4-tolylene diisocyanate and 20 percent 2,6-tolylene diisocyanate. The condensation product of hexanetriol-1,2,6 and propylene oxide is prepared by a conventional method, such as, for example, by placing the hexanetriol-1,2,6 and potassium hydroxide in a suitable reaction vessel and heating the mixture to 150° C. Propylene oxide is then added at this temperature. As the reaction proceeds, the pressure drops and more propylene oxide is added to the reaction vessel. When the desired molecular weight is reached the reaction is stopped and the alkali neutralized. About one mol hexanetriol is used per 10 mols propylene oxide. About 20 parts methylene chloride is added as a liquid substantially simultaneously with the mixing of the diisocyanate and condensation product of propylene oxide and hexanetriol. About two parts dibutyl-tin-di(2 ethylhexoate) and about 1.5 parts of a stabilizer having the formula

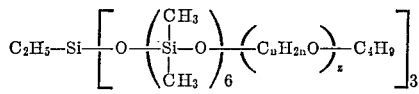

wherein ($C_nH_{2n}O$) represents about 17 oxyethylene units and about 13 oxypropylene units and $z$ is equal to about 30 are also mixed with the other ingredients substantially simultaneously. In a preferred embodiment the catalyst is mixed with a suitable organic solvent therefor, and the resulting solution is added to the stabilizer and condensation product. The diisocyanate is then added to the resulting mixture. The various ingredients may be mixed in an apparatus of the type disclosed in U.S. Patent 2,764,565 and the methylene chloride acts as a blowing agent producing a cellular structure. The resulting foam will have a density of about two pounds per cubic foot.

EXAMPLE 10

About 100 parts by weight of a triol prepared by condensation of propylene oxide and glycerine and having a molecular weight of about 3,000, about 1 part of dibutyl tin diacetate, and about 9 parts of a mixture containing about 80 percent 2,4-tolylene diisocyanate and about 20 percent 2,6-tolylene diisocyanate are all simultaneously mixed together substantially instantaneously. The resulting mixture reacts to form a solid nonporous elastic polyurethane. The mixture may be put into a mold, spread as a sheet, coated with a brush, sprayed as a coating, or used in many other ways before the mixture solidifies to a solid elastic nonporous polyurethane.

EXAMPLE 11

About 100 parts by weight of a triol prepared by condensation of propylene oxide and glycerine and having a molecular weight of about 3,000, about 1 part of tributyl tin oxide and about 9 parts of a mixture containing about 80 percent 2,4-tolylene diisocyanate and about 20 percent of 2,6-tolylene diisocyanate are all simultaneously mixed together substantially instantaneously. The resulting mixture reacts to form a solid nonporous elastic polyurethane. The mixture may be put into a mold, spread as a sheet, coated with a brush, sprayed as a coating, or used in many other ways before the mixture solidifies to a solid elastic nonporous polyurethane.

EXAMPLE 12

About 100 parts by weight of a triol prepared by condensation of propylene oxide and glycerine and having a molecular weight of about 3,000, about 1 part of dibutyl tin chloride, and about 9 parts of a mixture containing about 80 percent 2,4-tolylene diisocyanate and about 20 percent 2,6-tolylene diisocyanate are all simultaneously mixed together substantially instantaneously. The resulting mixture reacts to form a solid nonporous elastic polyurethane. The mixture may be put into a mold, spread as a sheet, coated with a brush, sprayed as a coating, or used in many other ways before the mixture solidifies to a solid elastic nonporous polyurethane.

EXAMPLE 13

About 100 parts by weight polypropylene ether glycol having an average molecular weight of about 2,000 and an hydroxyl number of about 56, about 38 parts of a mixture of 80 percent 2,4-tolylene diisocyanate and 20 percent 2,6-tolylene diisocyanate, about 5.5 parts of an activator containing about 1 part tributyl tin oxide, about 3.0 parts water and about 1.5 parts of a compound having the formula

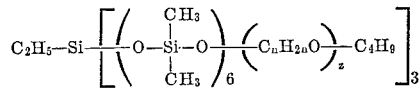

wherein $(C_nH_{2n}O)$ represents about 17 oxyethylene units and about 13 oxypropylene units and the value of $z$ is thus about 30, are mixed together substantially simultaneously with an apparatus of the type disclosed in U.S. Patent 2,764,565. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

It is to be understood that any other polyol contemplated herein may be substituted in the foregoing examples for the particular polyalkylene ether glycol and triol set forth. Moreover, any other suitable organic polyisocyanate may be substituted for the tolylene diisocyanate used in these examples and any compound represented by the above general formula may be substituted for the particular silicone specified in the examples.

Although all compounds represented by the general formula given hereinbefore are broadly contemplated, best results have been obtained with a compound having the formula

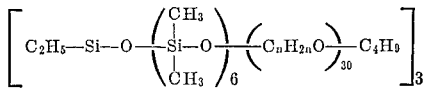

wherein $(C_nH_{2n}O)$ is a mixed polyoxyethylene and oxypropylene block containing about 17 oxyethylene units and about 13 oxypropylene units. Hence, it is preferred to use this compound in conjunction with the novel catalyst set forth herein to prepare a celular polyurethane. It has been found that the combination of catalyst and silicone provided by this invention can be used to best advantage in preparing a cellular polyurethane from a polyalkylene ether glycol having a secondary hydroxyl group, such as, for example, a polypropylene ether glycol.

The density of the product will vary with the amount of water used. Preferably, from about 1.5 to about 5 parts water per 100 parts polyol is used. An excess of polyisocyanate over that required to react with all the reactive hydrogen atoms of the polyol is used. Preferably, at least 10 percent excess over the equivalent amount of polyisocyanate is used. In other words, there should be a 10 percent excess mols of —NCO groups over the sum of the mols of —OH groups and twice the mols of water present in the reaction mixture.

As indicated in Example 9, the catalyst provided by this invention can be used to prepare a cellular polyurethane by reaction of any condensation product of an alkylene oxide having a molecular weight of at least about 500, an organic polyisocyanate and an inert gas blowing agent under substantially anhydrous conditions. Any suitable inert gas or gas producing material, such as, for example, air, carbon dioxide, methylene chloride, nitrogen, dichlorodifluoromethane, or the like may be used. It is indicated in Example 9 that the catalyst may be dissolved in a suitable solvent. The methylene chloride or dichlorodifluoromethane or other gas producing material may be used as a solvent. Other suitable solvents include acetone, ethyl acetate, hexane and the like. The gas blowing agent may be any material which is a gas at the temperature at which the foam occurs. Preferably, the foaming reaction is carried out at a temperature somewhere between room temperature of about 20° C. and about 100° C. Usually, only an amount of polyisocyanate equivalent to the hydroxyl groups of the condensation product of an alkylene oxide will be required although any excess over that amount can be used. In fact, the blowing might be achieved by a combination of an added inert gas and gas produced by reaction of water with a polyisocyanate.

The cellular product provided by this invention is particularly advantageous for use in upholstering furniture and for making underlay for carpets. It may also be used in arm rests on the interior of vehicles. The substantially nonporous polyurethane plastic provided by this invention is particularly advantageous for use as a potting compound in the electrical industry, as a protective or decorative coating, as an adhesive or for casting or molding a rubber-like article such as mallets, rollers, shock absorber mountings, vehicle tires and the like.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. In the preparation of a polyurethane plastic by a process which comprises reacting the condensation product of an alkylene oxide having a molecular weight of at least about 500 and an organic polyisocyanate, the improvement which comprises effecting the said reaction in the presence of a catalytic amount of a catalyst containing stannous oleate.

2. In the preparation of a polyurethane plastic by a process which comprises reacting the condensation product of an alkylene oxide having a molecular weight of at least about 500 and an organic polyisocyanate, the improvement which comprises effecting the said reaction in the presence of a catalytic amount of a catalyst containing stannous octoate.

3. In the preparation of a cellular polyurethane by a process which comprises reacting the condensation product of an alkylene oxide having a molecular weight of at least about 500 and an organic polyisocyanate, the improvement which comprises including in the reaction mixture a catalytic amount of a catalyst containing stannous oleate and stannous octoate.

4. A method for making a cellular polyurethane which comprises reacting a polyoxypropylene alcohol having at least two hydroxyl groups and a molecular weight of at least about 500 with an organic polyisocyanate in the presence of a catalytic amount of a catalyst containing stannous octoate, triethylene diamine and N-ethyl morpholine.

5. The method which comprises reacting an organic polyisocyanate with a polyalkylene ether polyol in the presence of a catalyst selected from the group consisting of stannous octoate and stannous oleate.

6. A method for making a cellular polyurethane in which all of the reactants are mixed together substantially simultaneously, said method comprising mixing together a condensation product of an alkylene oxide having a molecular weight of at least about 500, an organic polyisocyanate, water, and a catalytic amount of a catalyst containing a tertiary amine and a stannous salt of an acid having from 1 to 18 carbon atoms and a stabilizer containing a siloxane-oxyalkylene block copolymer having the formula

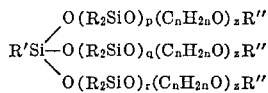

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34.

7. In a method for making a cellular polyurethane wherein a condensation product of an alkylene oxide having from 2 to 5 carbon atoms and having terminal hydroxyl groups is reacted with an excess of organic polyisocyanate in one step and the resulting prepolymer having terminal —NCO groups is reacted with water in a second step, the improvement which comprises effecting the said reaction with water in the presence of a catalytic amount of a catalyst containing a teriary amine and a stannous salt of an acid hving from 1 to 18 carbon atoms.

8. In the preparation of a polyurethane plastic by a process which comprises reacting the condensation product of an alkylene oxide having a molecular weight of at least about 500 and an organic polyisocyanate, the improvement which comprises effecting the said reaction in the presence of a catalytic amount of a catalyst containing a mixture of a stannous salt of an acid having from 1 to 18 carbon atoms and a member selected from the group consisting of triethylene diamine, tetramethyl butylene diamine, N-ethyl morpholine and a 1-alkyl-4-(dialkyl-amino-alkylene)piperazine.

9. A method for making a polyurethane which comprises reacting an organic polyisocyanate with a condensation product of an alkylene oxide in the presence of a catalytic amount of a stannous salt of a carboxylic acid having from 1 to 18 carbon atoms.

10. A process for producing a polyurethane which comprises reacting (a) an organic polyisocyanate with (b) a polyalkylene ether polyol, in the presence of a catalytic amount of stannous octoate, wherein the sole reactive groups present in said (a) and (b) are isocyanato and aliphatic alcoholic hydroxyl groups, respectively.

11. In the preparation of a polyurethane plastic by a process which comprises reacting the condensation product of an alkylene oxide having a molecular weight of at least about 500 and an organic polyisocyanate, the improvement which comprises effecting the said reaction with a catalytic amount of a catalyst containing a tertiary amine and a stannous salt of an acid having from 1 to 18 carbon atoms.

12. The process of claim 11 wherein said mixture contains from about 0.01 part to about 5 parts catalyst per 100 parts condensation product.

13. The process of claim 11 wherein said organic polyisocyanate is tolylene diisocyanate.

14. The process of claim 11 wherein the catalyst contains a stannous salt of an acid having from 1 to 8 carbon atoms.

15. In the preparation of cellular polyurethanes by a process which comprises reacting the condensation product of an alkylene oxide having a molecular weight of at least about 500, water and an organic polyisocyanate, the improvement which comprises effecting the said reaction with a catalytic amount of a catalyst containing a tertiary amine and a stannous salt of an acld having from 1 to 18 carbon atoms and a stabilizer containing a siloxaneoxyalkylene block copolymer having the formula

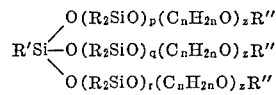

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34.

16. The process of claim 15 wherein said mixture contains from about 0.01 part to about 5 parts catalyst per 100 parts condensation product and from about 0.1 part to about 10 parts of a siloxane-oxyalkylene block copolymer having the formula

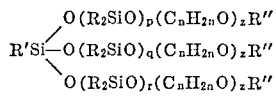

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34.

17. The process of claim 15 wherein the silicone has the formula

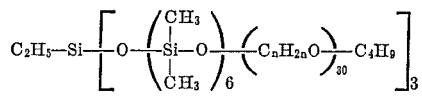

wherein $(C_nH_{2n}O)$ is a mixed polyoxyethylene and oxypropylene block containing about 17 oxyethylene units and about 13 oxypropylene units.

18. The process of claim 15 wherein the polyalkylene ether glycol is polypropylene ether glycol and the silicone has the formula

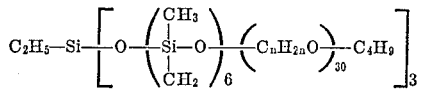

wherein $(C_nH_{2n}O)$ is a mixed polyoxyethylene and oxypropylene block containing about 17 oxyethylene units and about 13 oxypropylene units.

19. In the preparation of cellular polyurethanes by a process which comprises reacting the condensation product of an alkylene oxide having a molecular weight of at least about 500, and an organic polyisocyanate, the improvement which comprises effecting the said reaction with a catalytic amount of a catalyst containing a tertiary amine and a stannous salt of an acid having from 1 to 18 carbon atoms and a stabilizer containing a siloxane-oxyalkylene block copolymer having the formula

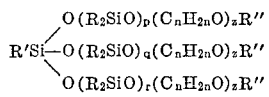

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equals to from about 26 to about 34.

20. The process of claim 19 wherein an inert gas is added to the reaction mixture to effect blowing.

References Cited

UNITED STATES PATENTS

| | | | |
|---|---|---|---|
| 2,374,136 | 4/1945 | Rothrock | 260—77.5 |
| 2,720,507 | 10/1955 | Caldwell | 260—75 |
| 2,764,565 | 9/1956 | Hoppe et al. | 260—2.5 |
| 2,833,732 | 5/1958 | Weyer | 260—2.5 |
| 2,834,748 | 5/1958 | Bailey et al. | 260—42 |
| 2,901,445 | 8/1959 | Harris | 260—2.5 |
| 2,949,431 | 8/1960 | Britain | 260—2.5 |
| 2,993,813 | 7/1961 | Tischbein | 260—2.5 |
| 2,993,869 | 7/1961 | Gmitter et al. | 260—2.5 |
| 2,893,898 | 7/1959 | Evans et al. | |
| 2,939,851 | 6/1960 | Orchin. | |

FOREIGN PATENTS

| | | |
|---|---|---|
| 860,109 | 12/1952 | Germany. |
| 729,222 | 3/1966 | Canada. |

DONALD E. CZAJA, *Primary Examiner.*

F. McKELVEY, *Assistant Examiner.*